4/1/86 4,579,274

United States Patent [19]

[11] Patent Number: 4,579,274

[45] Date of Patent: Apr. 1, 1986

Anspach et al.

[54] PROCESS FOR LINING A NUCLEAR STORAGE OR TRANSPORTATION CONTAINER

[75] Inventors: Walter Anspach, Karl Brendel, Mülheim; Elmar Schlich, Gründau; Peter Srostlik, Maintal, all of Fed. Rep. of Germany

[73] Assignee: Transnuklear GmbH, Hanau, Germany

[21] Appl. No.: 591,371

[22] Filed: Mar. 20, 1984

Related U.S. Application Data

[62] Division of Ser. No. 278,616, Jun. 29, 1981, abandoned.

[30] Foreign Application Priority Data

Jul. 2, 1980 [DE] Fed. Rep. of Germany ....... 3024979

[51] Int. Cl.⁴ .............................................. B23K 9/225

[52] U.S. Cl. .................................... 228/173.2; 29/446; 29/400 N; 228/173.6; 228/184

[58] Field of Search ..................... 29/447, 446, 400 N; 228/173 C, 173 A, 184

[56] References Cited

U.S. PATENT DOCUMENTS

| | | | |
|---|---|---|---|
| 1,934,064 | 11/1933 | Hermanson et al. | 138/151 X |
| 2,111,791 | 3/1938 | Larson | 220/415 |
| 2,414,931 | 1/1947 | Colwell et al. | 29/156.4 WL |
| 3,286,343 | 11/1966 | Alfille et al. | 29/400 N X |
| 3,365,786 | 1/1968 | Takemura et al. | 228/184 |
| 3,442,761 | 5/1969 | Feraday | 29/400 N X |
| 3,461,009 | 8/1969 | Snyder et al. | 220/3 X |
| 3,616,521 | 11/1971 | Boggio | 29/446 |
| 3,780,306 | 12/1973 | Anderson et al. | 250/428 |
| 3,969,805 | 7/1976 | Lievens et al. | 29/446 X |
| 4,388,752 | 6/1983 | Vinciguerra et al. | 29/446 X |

*Primary Examiner*—Kenneth J. Ramsey

*Attorney, Agent, or Firm*—Cushman, Darby & Cushman

[57] ABSTRACT

There are needed for containers for the transportation and/or for the storage of spent fuel elements inner linings which guarantee a good heat contact to the outer container and have little operating expense. This is attained by placing in the outer container a bottom and a flange, then positioning therebetween and welding thereto a jacket provided with an axial slot and thereby a flexible diameter. The slot is then subsequently likewise covered and welded.

8 Claims, 3 Drawing Figures

PROCESS FOR LINING A NUCLEAR STORAGE OR TRANSPORTATION CONTAINER

This is a division of application Ser. No. 278,616 filed June 29, 1981 now abandoned.

BACKGROUND OF THE INVENTION

The object of the present invention is an inner lining for a cylindrical container for the transportation and/or for the storage of radioactive materials, especially of irradiated fuel elements from nuclear reactors as well as a process for the production of such an inner lining.

Radioactive materials, especially spent fuel elements from nuclear reactors besides gamma and neutron radiation also give off significant residual heat. Containers which are employed for the transportation and/or for the storage of this type of material therefore must safely enclose the radioactivity of the inserted material and safely lead off the residual heat produced to the outside. This is demonstrated in such manner in rigorous tests that even in situations of extreme accidents the safety is guaranteed.

There are known containers consisting of a thick walled metallic outer container which guarantees the necessary mechanical strength and the shielding of the radioactive radiation, and an inner container or an inner container lining which additionally guarantee the inner inclusion of the radioactive materials from the viewpoint of corrosion, surface roughness and diffusion.

Containers of this type are available via inner linings which are applied by casting (German Pat. No. GM 78 192 82) or as sprayed coatings or as electroplated layer.

However, these processes have the disadvantage that either there can occur industrial testing difficulties, e.g. simulation of cast pipers with defective cast on inner lining, or the surface quality must be improved by expensive additional working.

Therefore, the invention is based on the problem of providing an inner lining for a cylindrical container for the transportation and/or storage of radioactive material, especially of irradiated fuel elements from nuclear reactors, which guarantee a good contact between inner lining (or liner) and the container with minimizing of the operating steps, as well as to provide a process for the production of such inner linings.

SUMMARY OF THE INVENTION

The problem was solved according to the invention by making the inner lining (or liner) of a bottom, a flange and a jacket provided with an axial slot which lies close to the inside of the container base body, whereby the jacket is welded with the bottom and the flange and the slot is covered.

Such inner linings are advantageously produced in such a manner that a bottom and a flange are placed in the container base body, then the metallic jacket rolled to the final dimensions, which jacket is provided with an axial slot positioned between bottom and flange by compression, subsequently again released from pressure, the jacket now lying on the inside of the container base body welded with bottom and flange and subsequently the slot is closed.

Preferably the slot is covered by a strip of sheet metal, especially welded.

Figure 1:
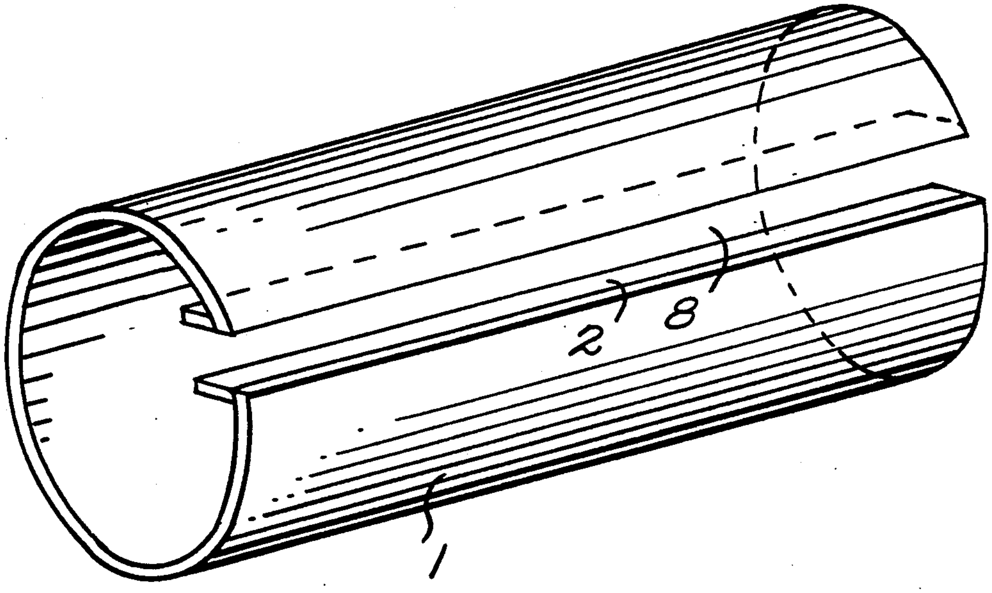
FIG. 1 is a schematic illustration of one form of inner lining for a container according to the invention.
Figure 2:
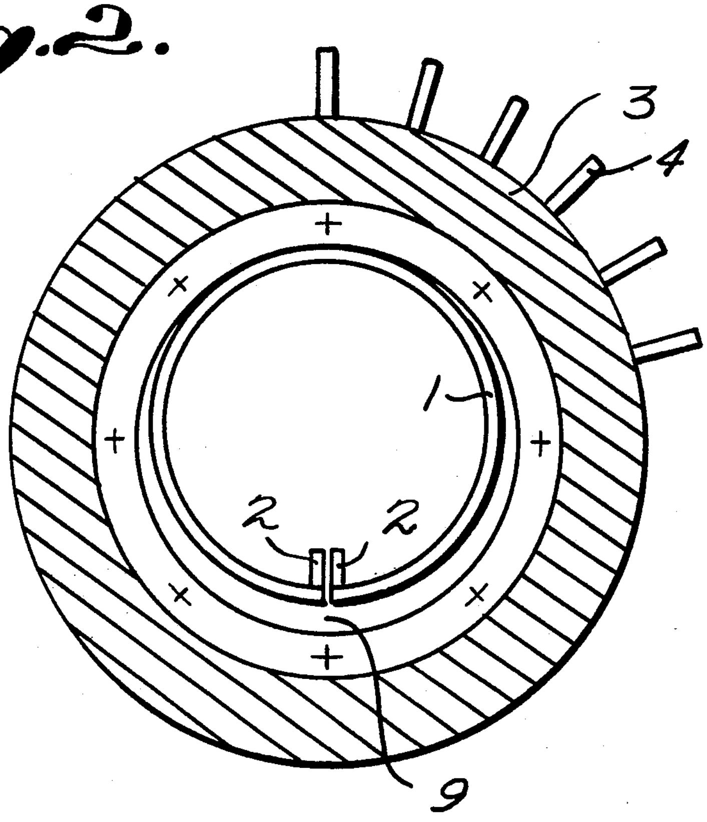
FIG. 2 is a sectional view of the inner lining for a container of FIG. 1.
Figure 3:
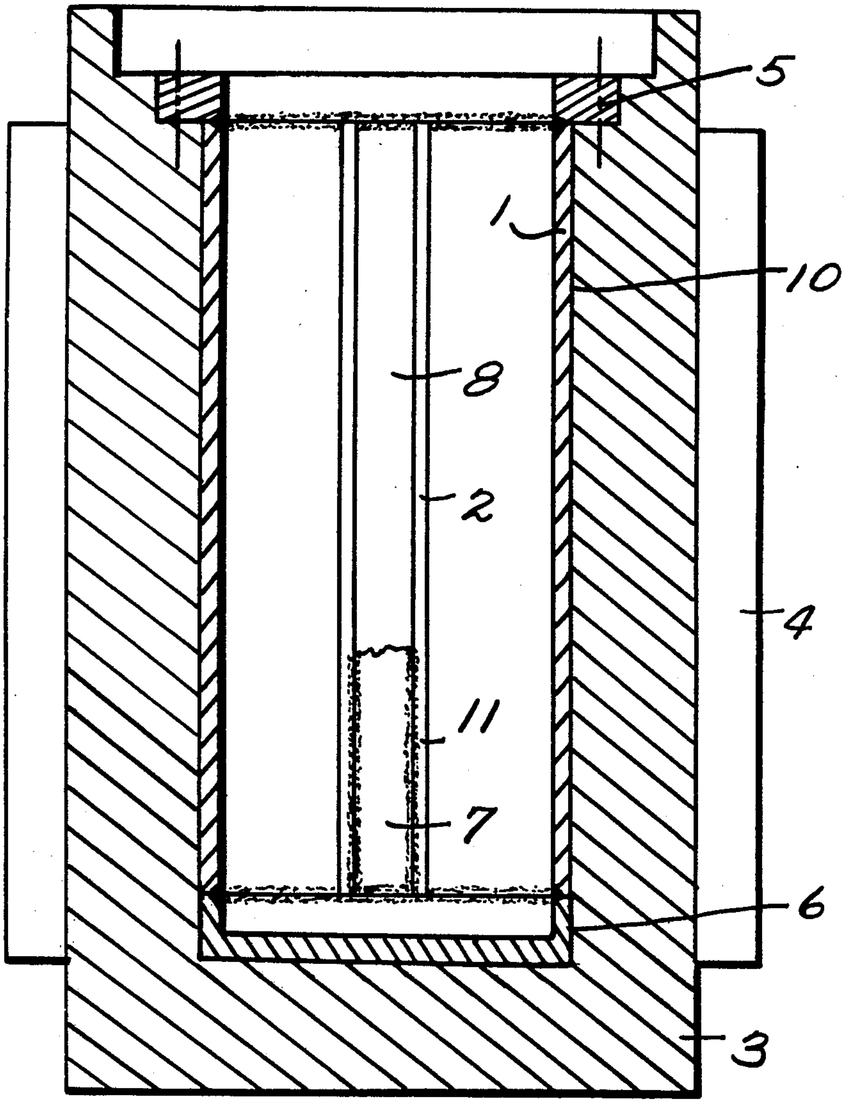
FIG. 3 is a sectional view of the inner lining of FIG. 1.

Referring more specifically to the drawings where the numerals indicate like parts first there is provided in the container base body having cooling fins 4 and other devices bottom 6 and flange 5. The jacket 1 is rolled to the final dimension and provided with an axial slot 8. Along the slot 8 advantageously there are welded assembly helping bars 2 which permits elastic deformation by contracting the jacket 1 so that it can be inserted in the container base body 2 with formation of a gap 9 in the assembly. Subsequently, tension on the jacket 1 is released. Through this it is placed against the base body 3. The axial slot 8 is covered with a suitable piece of sheet metal 7 and welded. It is especially favorable that with the manufacture of the base body 3 and the tolerances attainable thereby and the exactness possible today in rolling sheets there be attained an extraordinarily low tolerance of the cylindrical shape in the order of a few tenths mm with large inner diameter and container measurements. The surprising result thereby is that by the release of tension of the inner container jacket reduced in circumference in the assembly the remaining residual gap 10 between the base body 3 and the inner lining 1 is negligibly small and therefore a good heat transfer as well as good strength properties are guaranteed. The size of this residual gap 10 is substantially determined by the shrinkage of the axial welding seam 11.

The use of the invention is particularly advantageous on cylindrical containers having inner diameter>600 mm and wall thickness of the inner lining up to about 10 mm.

In many cases, it is especially favorable if the inner container jacket after the positioning and release of tension is additionally pressed against the inside of the container body.

The following example shows a container having an inner lining according to the invention.

DETAILED DESCRIPTION

Example

A container base body having cooling fins, produced of cast iron had an inner diameter of 1 meter and a length to diameter ratio of 5:1. The inner lining consisted of stainless steel having a thickness of 4 mm. First, the inner lining jacket was rolled to 1010 mm diameter and the assembly side secured. Then bottom and flange were placed in the container base body, the inner lining jacket contracted to about 990 mm diameter by means of a hydraulically operated assisting apparatus and placed in the provided position, adjusted and tension released. After the jacket itself was positioned on the inside of the container base body the slot having a metal sheet, likewise of stainless steel and having a corresponding wall thickness was welded and subsequently the assembly helper separated off. There followed accordingly the control of the welding seam as well as the final control.

The controls showed a tolerance on the inner diameter of the inner lining of the jacket of ±0.5 mm per 5 meters of length. The remaining residual gap even in the most unfavorable case was only $\leqq 0.5$ mm. A plastic deformation of the inner lining of the jacket was not detected, i.e., the deformation took place in the elastic region. Therefore, no testing for cracks is necessary.

The entire disclosure of German priority application No. P 3024979.7-33 is hereby incorporated by reference.

What is claimed is:

1. A process of preparing a combination of a cylindrical container adapted for the transportation or storage of radioactive materials such as irradiated fuel elements from nuclear reactors and an inner liner comprising placing an inner liner bottom portion and an inner liner flange in said cylindrical container, then positioning a cylindrical metal jacket portion which has been rolled to final dimension and which is provided with an axial slot between the bottom portion and the flange by compressing together the jacket at the slot axially inserting said jacket portion through the flange subsequently releasing the tension, then welding the jacket portion which now lies inside the cylindrical container to the bottom portion and the flange and subsequently closing the slot.

2. A process according to claim 1 including the step of covering the slot by a suitable sheet metal strip and welding the strip to the slot surface.

3. A process according to claim 2 wherein the jacket is provided with axially-running inner bars on the sides of the slot and the compressing of the jacket is aided by said bars.

4. A process according to claim 3 wherein the jacket is made of sheet metal having a thickness of up to 10 mm and has been rolled so that it conforms closely to the internal dimension of the cylindrical container.

5. A process according to claim 4 wherein after positioning the jacket and releasing the tension it is additionally pressed against the inner wall of the cylindrical container.

6. A process according to claim 1 wherein the jacket is provided with axially-running inner bars on the sides of the slot and compressing of the jacket is aided by said bars.

7. A process according to claim 1 wherein the jacket is made of sheet metal having a thickness of up to 10 mm and has been rolled so that it conforms closely to the internal dimension of the cylindrical container.

8. A process according to claim 1 wherein after positioning the jacket and releasing the tension it is additionally pressed against the inner wall of the cylindrical container.

* * * * *